US006781540B1

(12) United States Patent
MacKey et al.

(10) Patent No.: US 6,781,540 B1
(45) Date of Patent: Aug. 24, 2004

(54) RADAR SYSTEM HAVING MULTI-PLATFORM, MULTI-FREQUENCY AND MULTI-POLARIZATION FEATURES AND RELATED METHODS

(75) Inventors: Todd Hughes MacKey, Satellite Beach, FL (US); Steven Robert Heuser, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 10/371,471

(22) Filed: Feb. 21, 2003

(51) Int. Cl.[7] .............................................. G01S 13/00
(52) U.S. Cl. ...................... 342/25; 342/188; 342/189; 342/192; 342/195
(58) Field of Search ............................ 342/25, 89, 90, 342/96, 98, 99, 159, 161, 162, 188, 189, 191, 192, 195, 196

(56) References Cited

U.S. PATENT DOCUMENTS

| | | |
|---|---|---|
| 4,982,150 A | 1/1991 | Silverstein et al. ....... 324/77 G |
| 5,068,597 A | 11/1991 | Silverstein et al. ....... 324/77 B |
| 5,093,563 A | 3/1992 | Small et al. ............. 250/201.9 |
| 5,383,457 A | 1/1995 | Cohen .................. 128/660.07 |
| 5,394,151 A | 2/1995 | Knaell et al. ................. 342/25 |
| 5,519,526 A | 5/1996 | Chua et al. ................. 359/152 |
| 5,621,413 A | 4/1997 | Lempkowski et al. ...... 342/117 |
| 5,745,069 A | 4/1998 | Gail ........................... 342/25 |
| 5,808,580 A | 9/1998 | Andrews et al. ............ 342/162 |
| 5,815,111 A | 9/1998 | Gouenard et al. ............. 342/25 |
| 5,926,125 A | 7/1999 | Wood .......................... 342/25 |
| 6,037,892 A * | 3/2000 | Nikias et al. ................. 342/25 |
| 6,200,266 B1 | 3/2001 | Shokrollahi et al. ........ 600/438 |
| 6,219,142 B1 * | 4/2001 | Kane ......................... 356/450 |
| 6,347,264 B2 | 2/2002 | Nicosia et al. ................ 701/16 |
| 6,359,584 B1 | 3/2002 | Cordey et al. .............. 342/169 |
| 2004/0021598 A1 * | 2/2004 | Garren ........................ 342/25 |

OTHER PUBLICATIONS

"Measurement of s band clutter statistics using quasi-deconvolution filter for a phase coded wavefonn", LeFurjah, G.; Foreman T.; de Forest Boyer, D.;Radar, 2003. Proceedings. 2003 IEEE Conference on, 2003 pp.:34–37.*

"Sequence CLEAN technique using BGA for contiguous radar target images with high sidelobes", Bose, R.; Aerospace and Electronic Systems, IEEE Transactions on , vol.: 39, Issue: 1, Jan. 2003 pp.:368–373.*

"Sequence CLEAN: a modified deconvolution technique for microwave images of contiguous targets", Bose, R.; Freedman, A.; Steinberg, B.D.; Aerospace and Electronic Systems, IEEE Trans on, vol.: 38, Issue: 1, Jan. 2002 Ps:89–97.*

"Iterative noncoherent angular superresolution", Richards, M.A.; Radar Conference, 1988, Proceedings of the 1988 IEEE National , Apr. 20–21, 1988 pp.:100–105.*

* cited by examiner

*Primary Examiner*—John B. Sotomayor
(74) *Attorney, Agent, or Firm*—Allen, Dyer, Doppelt, Milbrath & Gilchrist, P.A.

(57) ABSTRACT

A radar system may include an antenna, a waveform generator for generating a plurality of waveforms for different polarizations and/or having different frequency components, and a transmitter connected to the waveform generator for transmitting the plurality of waveforms via the antenna. Moreover, the radar system may also include a receiver connected to the antenna for receiving reflected signals from targets, and a processor for iteratively deconvolving the reflected signals to generate target data. More particularly, the radar system and targets may be relatively movable with respect to one another, and the processor may therefore store reflected signals over a length of relative movement and generate the target data based upon the stored signals to thus provide a synthetic aperture radar (SAR) system or an inverse SAR (ISAR) system.

90 Claims, 20 Drawing Sheets

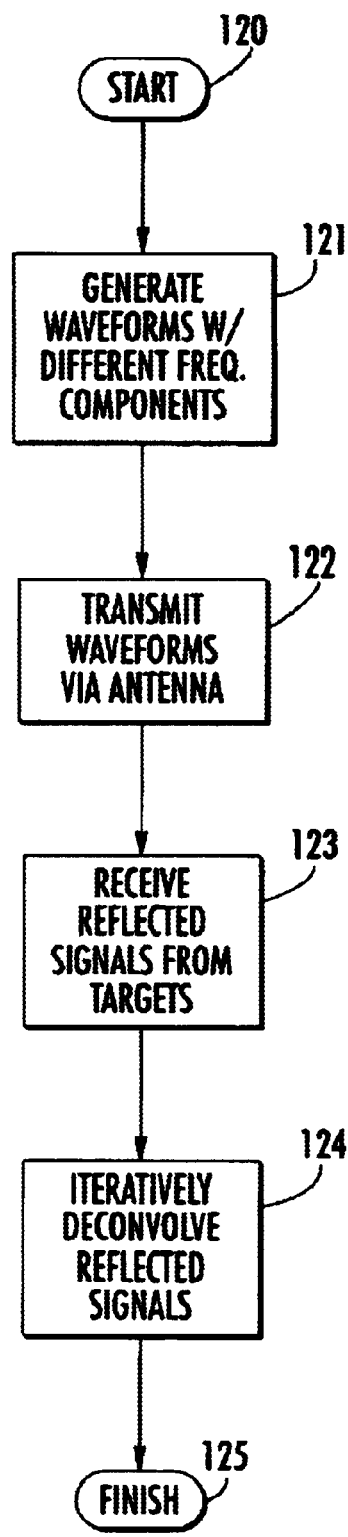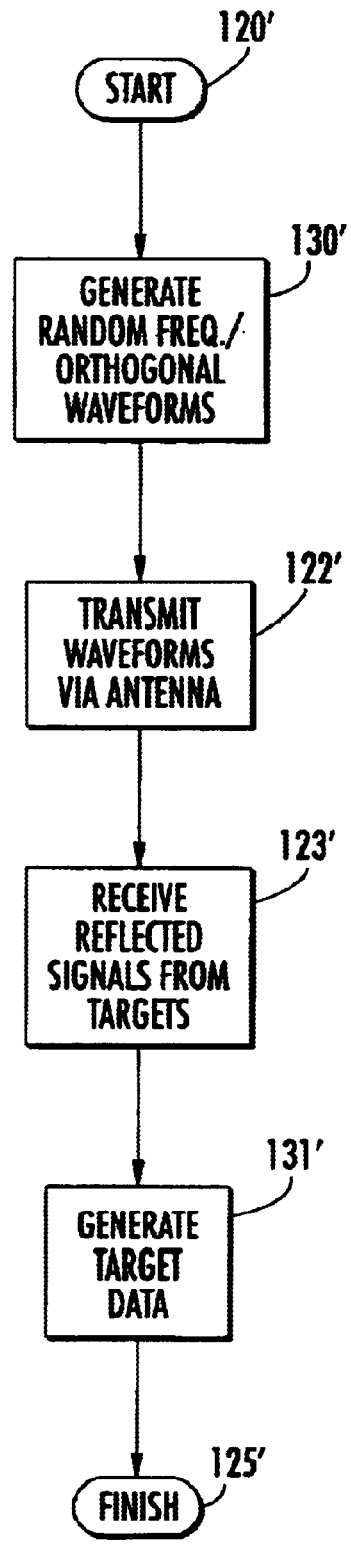
FIGURE 12                    FIGURE 13

RADAR SYSTEM HAVING MULTI-PLATFORM, MULTI-FREQUENCY AND MULTI-POLARIZATION FEATURES AND RELATED METHODS

GOVERNMENT LICENSE RIGHTS

The U.S. Government has a paid-up license in this invention and the right in limited circumstances to require the patent owner to license others on reasonable terms as provided for by the terms of contract No. NRO000-01-C-4395, awarded by the National Reconnaissance Office.

FIELD OF THE INVENTION

The present invention relates to the field of communications, and, more particularly, to radar systems and related methods.

BACKGROUND OF THE INVENTION

Radio detecting and ranging, or radar as it is commonly known, is used for a wide variety of applications. For example, radars are used for tracking the position of airplanes, monitoring atmospheric conditions, and mapping terrain. Basic radar systems operate by transmitting a waveform, usually in the form of a pulse, at a target. The time between transmission and reception of signals reflected from the target provides a range measurement, i.e., a measurement of the line of sight to the target. Furthermore, the angle-of-arrival of the reflected signals also provides an azimuth measurement of the target which is orthogonal to the range direction.

To achieve fine azimuth resolution, a large antenna may be required to properly focus the transmitted and received signals. Moreover, if relatively low frequencies, such as UHF or VHF frequencies, are used by the radar, the size of the antenna required to obtain desired azimuth resolution will be even larger. Thus, when the radar is to be carried by an airborne or spaceborne platform (e.g., an airplane or satellite), the antenna size required to achieve sufficient azimuth resolution may be prohibitive.

For such applications, a different radar technique has been developed called synthetic aperture radar (SAR). Rather than use an unmanageably long antenna to obtain the desired azimuth resolution, SAR takes advantage of relative movement between the radar system and the target. In the case of an airborne or spaceborne platform, the radar system moves over targets below the platform, which may or may not be stationary.

Basically, a SAR collects reflected signals over an extended distance or length of travel of the platform and processes this data as if it came from a much longer antenna. That is, the distance the platform travels is referred to as the synthetic aperture, which yields greater resolution than would otherwise be possible simply based upon the actual physical size of the antenna. Of course, the same approach may essentially be used in reverse for tracking moving targets using a stationary radar system, which is known as an inverse SAR (ISAR).

Despite the advantages of SAR, its unique characteristics also present several challenges in processing the reflected signals. For example, due to the Doppler effect caused by the relative movement between the radar system and target, range/Doppler ambiguities result. Larger scene extents in azimuth require higher pulse repetition frequencies (PRFs) to measure the larger Doppler spread of the reflectivity measurements. However, larger range extents of the scene require lower PRFs to avoid range ambiguities due to simultaneous returns from more than one transmit pulse.

In order to achieve a small enough scene size in range and azimuth that allows a workable PRF, traditional SAR design calls for a narrow antenna beam and, therefore, a large antenna area. The antenna area requirement for unambiguous SAR increases versus wavelength such that lower frequency SAR is more difficult. Also, the required antenna area increases dramatically for shallower grazing angles. This problem is also exacerbated for spaceborne SAR due to the high orbital velocity and long stand-off range.

Various prior art SAR techniques have been developed to address some of these problems. By way of example, U.S. Pat. No. 5,815,111 is directed to a method of defocusing range ambiguities in a pulse radar, such as a SAR. The method includes spreading radar pulses at transmission using a plurality of "chirp" rules for varying the frequency of the transmitted wave as a function of time. During the transmission of successive pulses, chirp rules are alternated between chirps that rise and chirps that fall in the frequency/time plane of the pulse. Furthermore, received echoes are compressed by matched filtering using a correlation operation between the received echo signal and the chirp rule that was applied at the time of transmission of the pulse which gave rise to the echo signal. U.S. Pat. No. 5,926,125 describes a similar technique for suppressing ambiguities using alternating swept frequency pulses.

U.S. Pat. No. 5,808,580 is directed to a waveform/signal processing concept that uses a train of frequency coded pulses. The pulses include the same frequencies but have a different time-frequency ordering. This patent also notes that phase-coded pulses may optionally be used. A stack of correlators are also disclosed for providing the subsequent pulse compression.

The above prior art all allow an N-times higher PRF, and therefore an N-times smaller antenna area, while suppressing range-Doppler ambiguities. However, significant cross-correlation artifacts remain after the correlation/matched filtering operations. The correlation operation against a subpulse 1, for example, will not only produce an auto-correlation result for the subpulse 1 signal but will also produce cross-correlation artifacts for the other N−1 subpulse signals that are simultaneously returning. These artifacts (i.e., sidelobes) produce what is known as multiplicative noise since their amplitude scales linearly with target signal amplitude. This multiplicative noise severely degrades the image quality and observable scene dynamic range. For larger values of N the scene measurement can be rendered unusable with these prior art approaches.

Furthermore, the above-noted prior art approaches all use a train of N pulses that implicitly are repeated until the required processing interval has been measured. Yet, the periodic repetition of each of the N waveforms produces cross-range (i.e., azimuth) sidelobes that also degrade the image quality.

U.S. Pat. No. 5,745,069 also describes a prior art approach using a train of N subpulses. This invention considers frequency-orthogonal pulses and essentially trades frequency bandwidth for ambiguity suppression. The radar bandwidth is N-times higher, and the required antenna area is N-time less, but the range resolution corresponds to the fractional 1/N subpulse bandwidth.

Certain prior art approaches have addressed SAR image sidelobe artifacts by using a CLEAN algorithm, which is a form of iterative deconvolution. For example, U.S. Pat. No. 5,394,151, which is directed to an apparatus and method for producing three-dimensional images, estimates the location and complex strengths of scatterers and uses these estimates to generate a side lobe free image using a CLEAN algorithm. Another similar method and apparatus for processing radar images using a CLEAN algorithm is disclosed in U.S. Pat. No. 5,383,457. These approaches may effectively remove auto-correlation (impulse response) sidelobes, but they use single frequency waveforms and thus do not address cross-correlations caused by multiple frequency waveforms.

SUMMARY OF THE INVENTION

In view of the foregoing background, it is therefore an object of the present invention to provide a radar system, such as a synthetic aperture radar (SAR) system, for example, which provides desired range and azimuth resolution and allows high PRF operation with smaller antennas while removing auto and/or cross-correlation artifacts.

This and other objects, features, and advantages in accordance with the present invention are provided by a radar system which may include an antenna, a waveform generator for generating a plurality of waveforms having different frequency components, and a transmitter connected to the waveform generator for transmitting the plurality of waveforms via the antenna. Moreover, the radar system may also include a receiver connected to the antenna for receiving reflected signals from targets, and a processor for iteratively deconvolving the reflected signals to generate target data.

The use of waveforms having different frequency components advantageously allows an increased pulse repetition frequency (PRF) to be used to resolve an extended Doppler footprint, as resulting range ambiguities and/or auto/cross-correlation artifacts may be removed through the iterative deconvolution processing. By way of example, the waveform generator may pseudorandomly select the different frequency components for the waveforms, as well as generate the plurality of waveforms such that at least some of the waveforms are orthogonal to one another. This causes the resulting ambiguities to be spread in range and cross-range. The different frequency components may also be contiguous to define stepped frequency pulses or spaced apart in frequency.

By way of example, the processor may iteratively deconvolve the reflected signals using a CLEAN algorithm which selects a brightest target from among the reflected signals and moves the target peaks to a "clean" image with no noise background. The side lobes or artifacts from the target are then deconvolved to reveal a next brightest target, and the foregoing process continues until all of the desired targets have been distinguished from the reflected signals. In particular, such artifacts may be caused by both auto-correlation and cross-correlation. In accordance with the invention, the processor may iteratively deconvolve the reflected signals to remove auto and/or cross-correlation artifacts.

Additionally, the antenna may advantageously operate using different polarizations (e.g., right and left-hand circular polarizations, horizontal and vertical polarizations, etc.), and the waveform generator may generate waveforms for the different polarizations. Moreover, an encoder may be connected between the waveform generator and the transmitter for encoding the waveforms using identification codes (e.g., pseudorandom number codes) corresponding to the different polarizations. Further, the transmitter may simultaneously transmit the encoded waveforms for the different polarizations, and the processor may separate different reflected polarization signals based upon the identification codes prior to iteratively deconvolving the reflected signals. Thus, since separate transmission cycles are not required for transmitting the different polarizations, no increase in PRF is required and temporal decorrelations may be avoided.

More particularly, the radar system and targets may be relatively movable with respect to one another, and the processor may therefore store reflected signals over a length of relative movement and generate the target data based upon the stored signals to thus provide a synthetic aperture radar (SAR) system or an inverse SAR (ISAR). The antenna may be a phased array antenna, for example.

A method aspect of the invention is for generating target data and may include generating a plurality of waveforms having different frequency components and transmitting the plurality of waveforms via an antenna. The method may further include receiving reflected signals from targets via the antenna and iteratively deconvolving the reflected signals to generate the target data.

More particularly, generating may include pseudorandomly selecting the different frequency components for the waveforms. Generating the waveforms may also include generating different frequency components that are contiguous to define stepped frequency pulses, or generating different frequency components that are spaced apart in frequency. The plurality of waveforms may also be generated such that at least some of the waveforms are orthogonal to one another.

Additionally, the antenna may operate using different polarizations, and generating may further include generating waveforms for the different polarizations. By way of example, the different polarizations may be horizontal and vertical polarizations, as well as right-hand and left-hand circular polarizations. The waveforms for the different polarizations may also be simultaneously transmitted.

The method may also include encoding the waveforms using identification codes corresponding to the different polarizations, and separating different reflected polarization signals based upon the identification codes prior -to iteratively deconvolving the reflected signals. For example, the identification codes may be pseudorandom number codes.

Furthermore, the iterative deconvolution may include iteratively deconvolving the reflected signals to remove auto and/or cross-correlation artifacts. Also, the radar system and targets may be relatively movable with respect to one another, reflected signals may be stored over a length of relative movement, and the stored signals may be processed to generate the target data.

BRIEF DESCRIPTION OF THE DRAWINGS

FIGS. 12–15 are flow diagrams illustrating methods for generating target data in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple notation are used to indicate similar elements or steps in alternate embodiments. Such elements or steps may therefore only be mentioned or described upon their first occurrence to avoid undue repetition, but it will be understood that such descriptions are equally applicable to subsequent occurrences of similar elements or steps.

Figure 1:
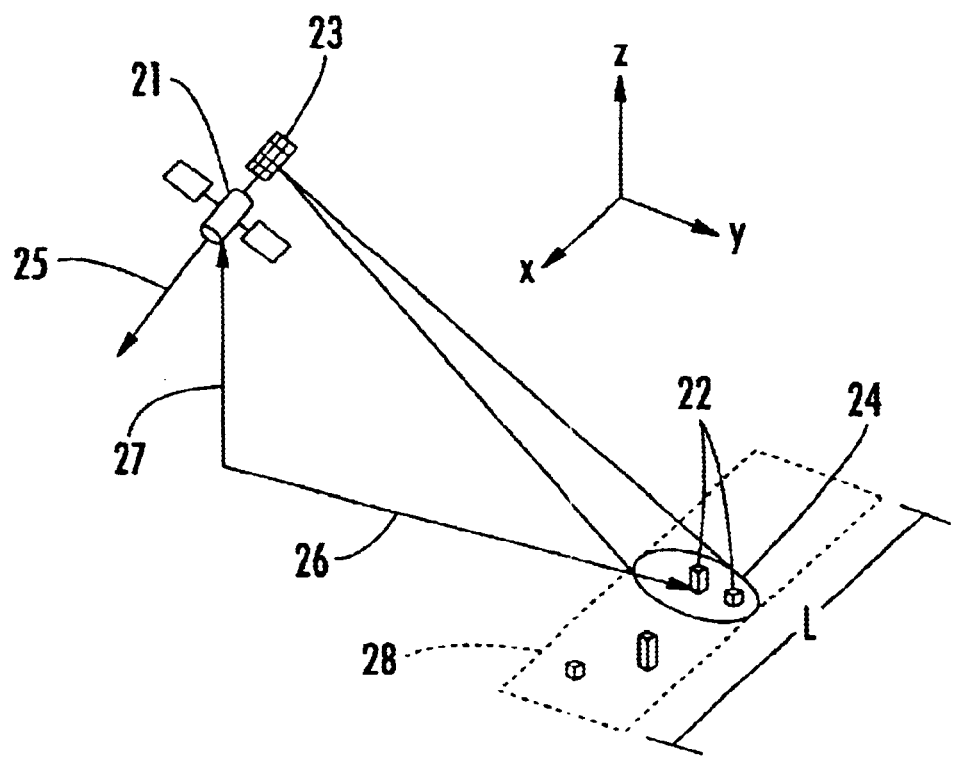
FIG. 1 is perspective view of a synthetic aperture radar (SAR) system in accordance with the invention carried by a spaceborne platform.
Figure 2:
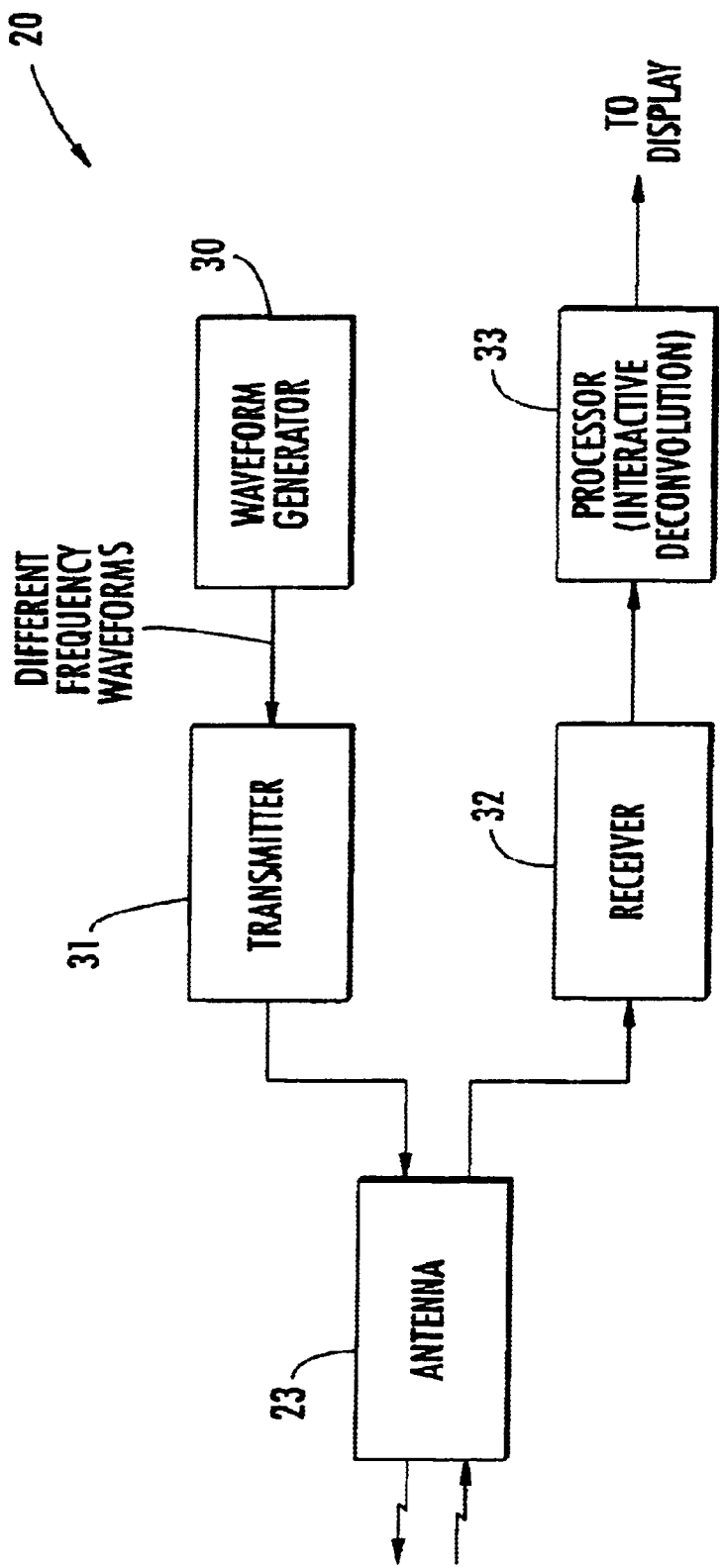
FIG. 2 is a schematic block diagram of a first embodiment of the radar system of FIG. 1.

Referring initially to FIGS. 1 and 2, a radar system 20 in accordance with the present invention for generating target data is mounted on a spaceborne platform, namely a satellite 21, as illustratively shown. The radar system could also be mounted on an airborne platform (e.g., an aircraft) in a similar manner. For example, the radar system 20 may be used for mapping terrain, tracking the position and movement of targets 22 on the ground, etc. The radar system includes one or more antennas 23 carried by the satellite 21 for transmitting radar signals or waveforms at a desired target area and receiving signals reflected from targets in the area.

The transmitted waveforms, which are typically sent as individual pulses, cover a given area or footprint 24 on the ground. The targets 22 within the footprint 24 have azimuth, range, and altitude values associated therewith which are measured with respect to the position of the radar system 20. In the illustrated embodiment, azimuth is measured along the path of travel 25 of the satellite 21 (i.e., along the x-axis). Further, the range is the distance 26 along the y-axis from the satellite 21 to a given target 22, and the altitude is the height 27 of the satellite above the target.

More particularly, in the illustrated example the radar system 20 operates as a synthetic aperture radar (SAR), in that the radar system moves over the targets 22 and stores reflected radar signals over a length 1 of the path of travel 25 of the satellite 21. Thus, rather than generating image data for each individual waveform, stored images corresponding to an entire area 28 defined by the range width of the footprint 24 and the length 1 are processed together to generate image data for the area. As noted above, this technique provides a much greater azimuth resolution than would otherwise be possible by processing each series of reflected signals individually, because the length of the antenna 23 along the x-axis is thus equivalent to the length 1, which defines the "synthetic" aperture of the radar system 20.

Of course, while the radar system 20 is illustratively shown as moving over stationary targets 22, it will be appreciated by those of skill in the art that the radar system may also be implemented as an inverse SAR (ISAR), i.e., where the radar system is stationary (e.g., ground based) and the targets 22 are moving. The radar system 20 may also be used in other radar applications as well. For purposes of the following description, the radar system 20 will be described as a SAR for clarity of explanation. However, those of skill in the art will readily understand how to apply the teachings provided herein to ISAR and other radar systems.

The radar system 20 illustratively includes a waveform generator 30 for generating a plurality of waveforms having different frequency components, as will be described further below, or possibly encoded with some type of pseudorandom sequence. It also illustratively includes a transmitter 31 connected to the waveform generator for transmitting the plurality of waveforms via the antenna 23. Moreover, the radar system 20 also illustratively includes a receiver 32 connected to the antenna 23 for receiving reflected signals from the targets 22, and a processor 33 for generating target data based thereon. The target data may then be passed to a display (not shown) for visual inspection, etc., as will be appreciated by those skilled in the art.

Many radar systems generate waveforms which include frequency components for an entire frequency range or bandwidth used by the system. By way of example, the radar system 20 of the present invention may be used for bandwidths corresponding to the radio frequency (RF) range, particularly the VHF/UHF range. This is of concern due to the unreasonably large aperture sizes needed at these frequencies to adequately suppress ambiguities due to the extent of the scene. Of course, it will be appreciated that the other frequencies may be used as well, such as in the case of lidar, for example.

Depending upon the given application, the resulting signals reflected by the targets 22 using the multiple-waveform approach can have very pronounced auto and/or cross-correlation side lobes or ambiguities which are difficult to distinguish from actual targets. Thus, in the illustrated embodiment, the waveform generator 30 advantageously generates waveforms having different frequency components or pseudorandom codes which, when taken together, cover the entire bandwidth used by the radar system 20. The use of waveforms having different frequency components and/or pseudorandom codes helps to spread these artifacts in range and cross-range dimensions so that they will be less pronounced.

Figure 3A:
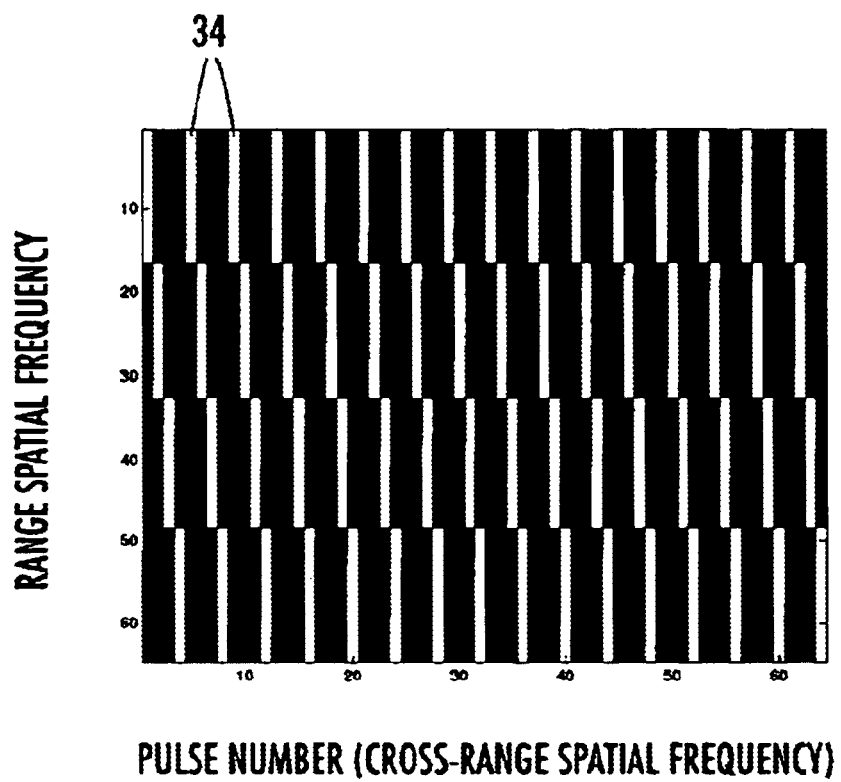
FIG. 3a is a spectral transfer function plot for waveforms generated by the waveform generator of FIG. 2 having stepped frequency components.

The different frequency components may be selected using various approaches. By way of example, the different frequency components may be contiguous to define stepped frequency pulses, as may be seen in the spectral transfer function illustratively shown in FIG. 3a. Here, the spectral transfer function corresponds to one of four range swaths, as will be appreciated by those of skill in the art. Moreover, the bandwidth is divided over N waveforms (or pulses) 34, each of which corresponds to contiguous 1/N portions of the bandwidth.

Figure 3B:
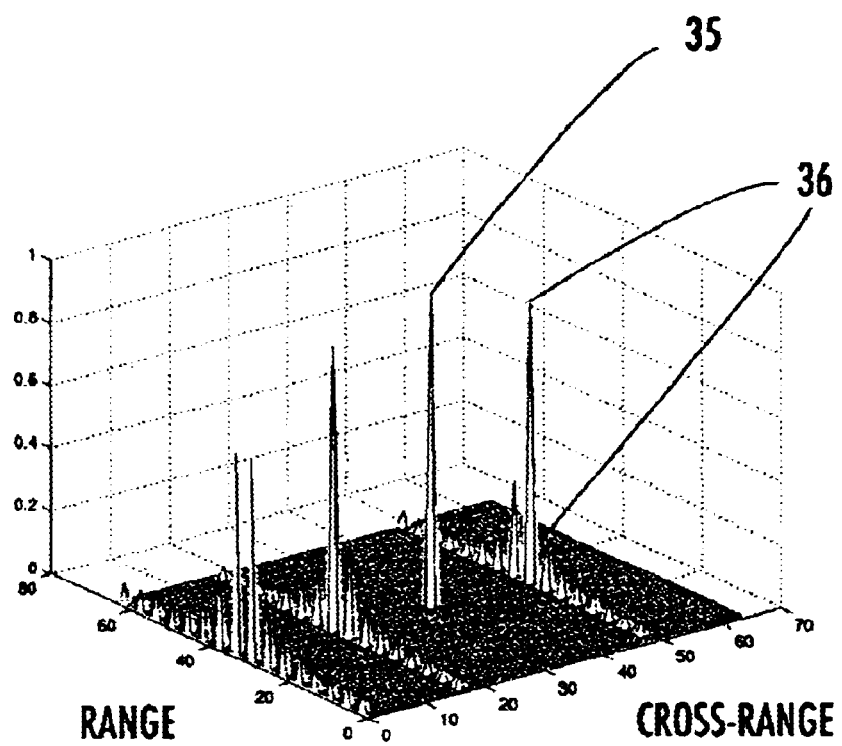
FIG. 3b is a graph of an impulse response function resulting from the reflection of the waveforms illustrated in FIG. 3a off of a target.

Referring to FIG. 3b, a simulated impulse response (IPR) function resulting from reflections of the stepped frequency pulses 34 is shown. Here, the input scene includes a single target, from which a target signal 35 is generated by the reflection of the pulses 34. It will be appreciated by those skilled in the art that the IPR range resolution is given by the composite range spatial frequency extent, and in the present example each range spatial frequency is measured at 1/Nth the effective pulse repetition frequency (PRF). Thus, while the stepped frequency pulses do provide relatively low noise along many portions of the cross-range scale, the effective PRF does cause some recurring cross-range ambiguities 36 located at about 0, 16, and 49 on the cross-range scale.

Figure 4A:
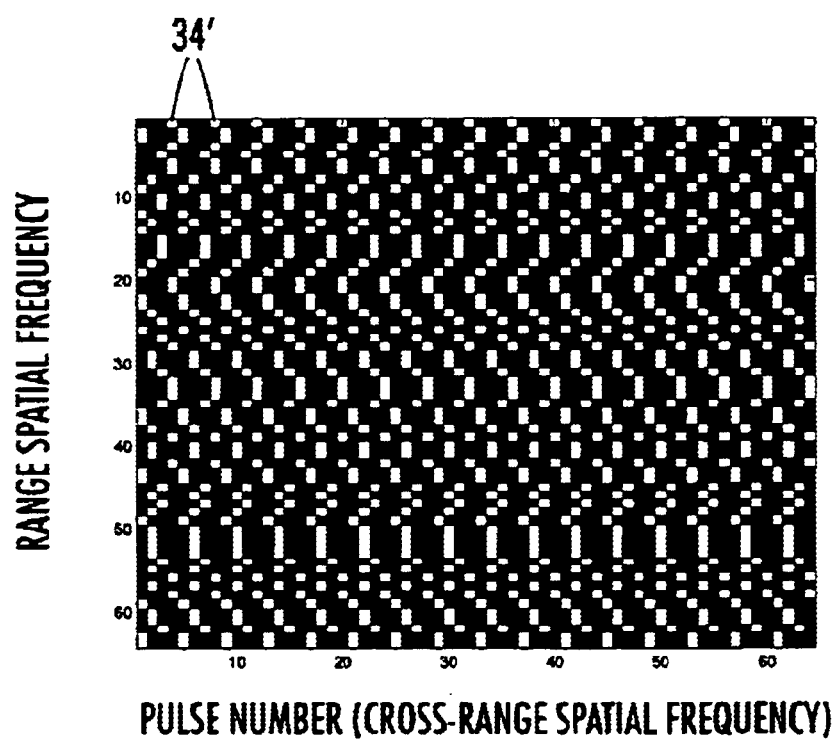
FIG. 4a is a spectral transfer function plot for waveforms generated by the waveform generator of FIG. 2 having spaced apart or fragmented frequency components.

Another example of waveforms 34' having different frequency components may be seen in FIG. 4a. Here, the various frequency components of the waveforms 34' are spaced apart, or fragmented, in frequency. More particularly, each of the N illustrated waveforms 34' has pseudorandomly generated spectral fragments each corresponding to 1/Nth of the total bandwidth, which when combined cover the entire bandwidth.

Figure 4B:
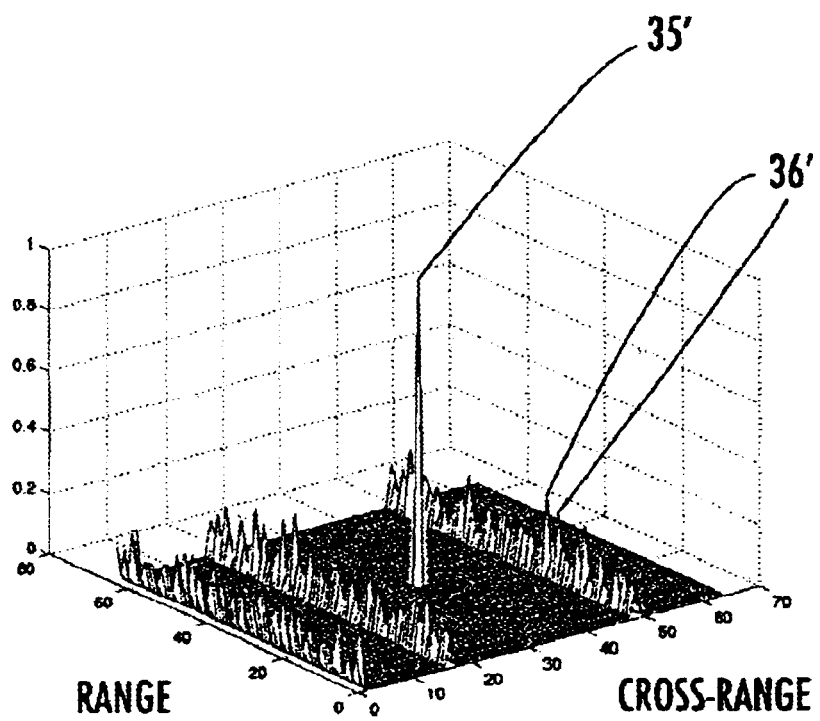
FIG. 4b is a graph of an impulse response function resulting from the reflection of the waveforms illustrated in FIG. 4a off of a target.

Using the same input scene described above with reference to FIG. 3b, reflections of the waveforms 34' provide the simulated impulse response function illustrated in FIG. 4b. Here again, each range spatial frequency is measured at 1/Nth the effective PRF, which again provides some cross-range ambiguities 36' at about 0, 16, and 49 on the cross-range scale. Nonetheless, it will be noted that the pseudo-random selection of the frequency components helps to spread the cross-range ambiguities 36' in range so that these ambiguities are less pronounced.

Figure 5:
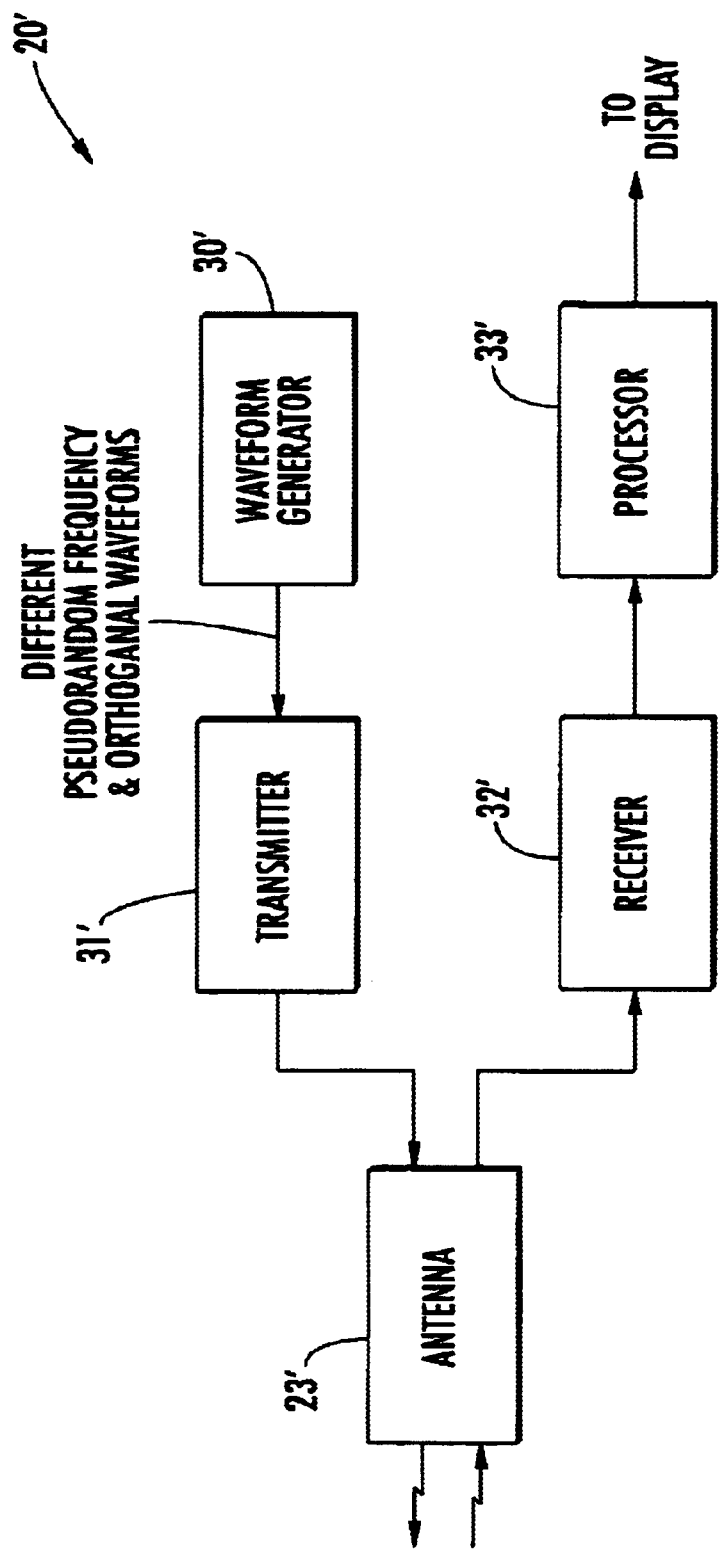
FIG. 5 is a schematic block diagram of a second embodiment of the radar system of FIG. 1.
Figure 6A:
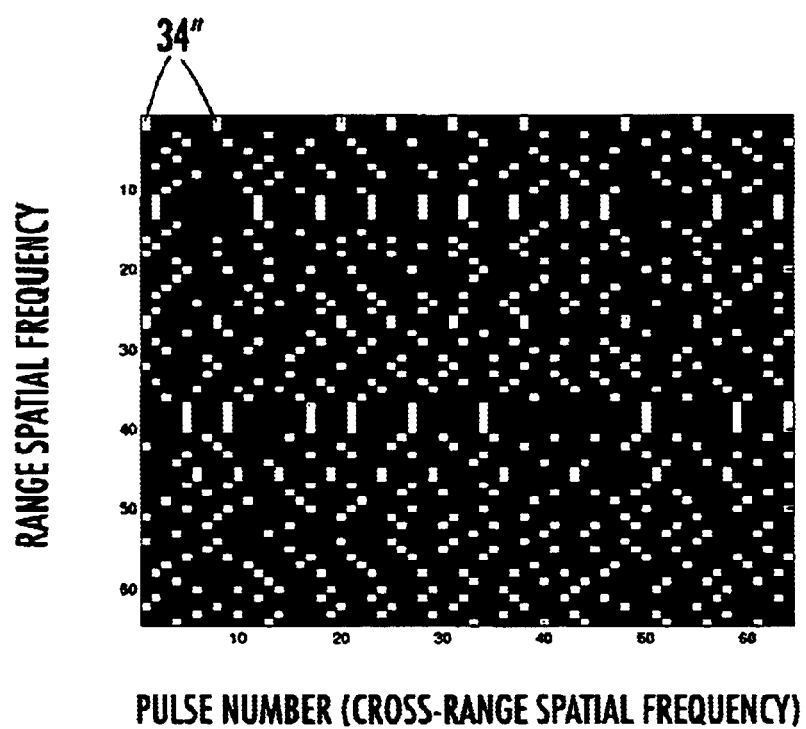
FIG. 6a is a spectral transfer function plot for waveforms generated by the waveform generator of FIG. 2, selective ones of which are orthogonal, which have pseudorandomly selected frequency components.

A still further example of waveforms having different frequency components is now described with reference to a second embodiment of the radar system 20' illustrated in FIG. 5, as well as FIGS. 6a and 6b. The waveform generator 30' generates M waveforms 34" each including a pseudo-randomly selected 1/M portion of the bandwidth. Moreover, certain of the waveforms 34" are also orthogonal to one another. That is, the waveforms 34" are randomly sequenced such that consecutive N waveforms are orthogonal, as illustratively shown in FIG. 6a.

Figure 6B:
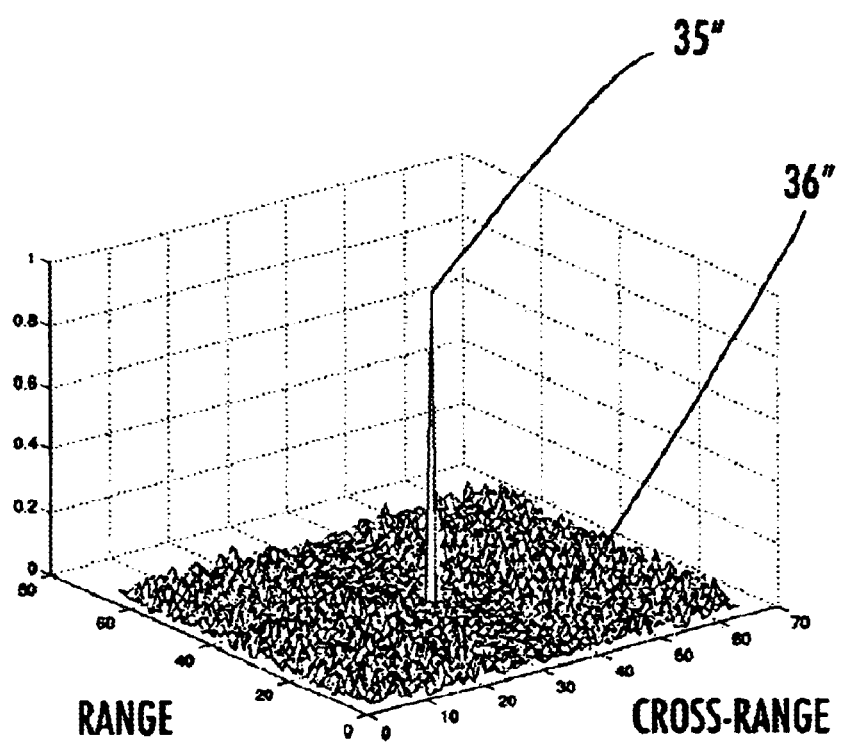
FIG. 6b is a graph of an impulse response function resulting from the reflection of the waveforms illustrated in FIG. 6a off of a target.
Figure 7:
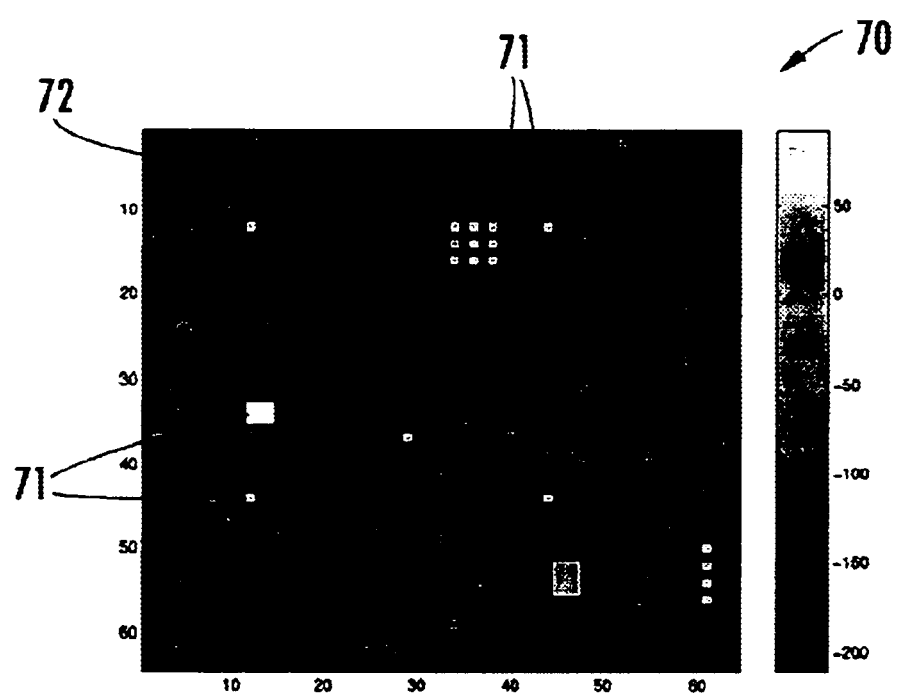
FIG. 7 is a log scale plot of a reference input scene with additive noise for the radar system of the present invention.
Figure 8A:
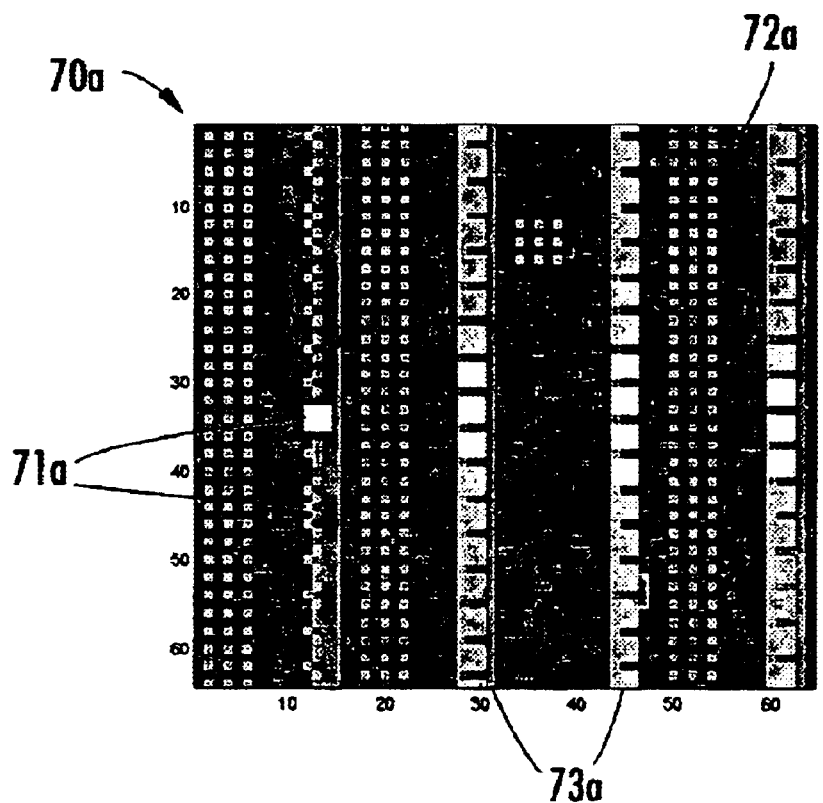
FIGS. 8a–8c are log scale plots of scene estimates of the reference input scene of FIG. 7 resulting from the waveforms illustrated in FIGS. 3a, 4a, and 6a, respectively.
Figure 8B:
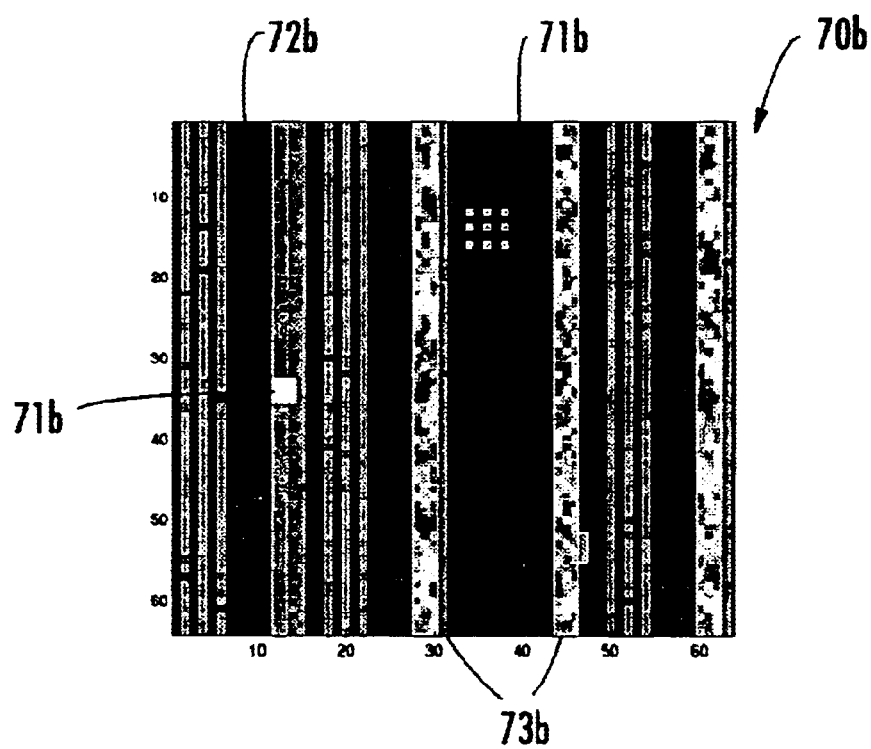
Figure 8C:
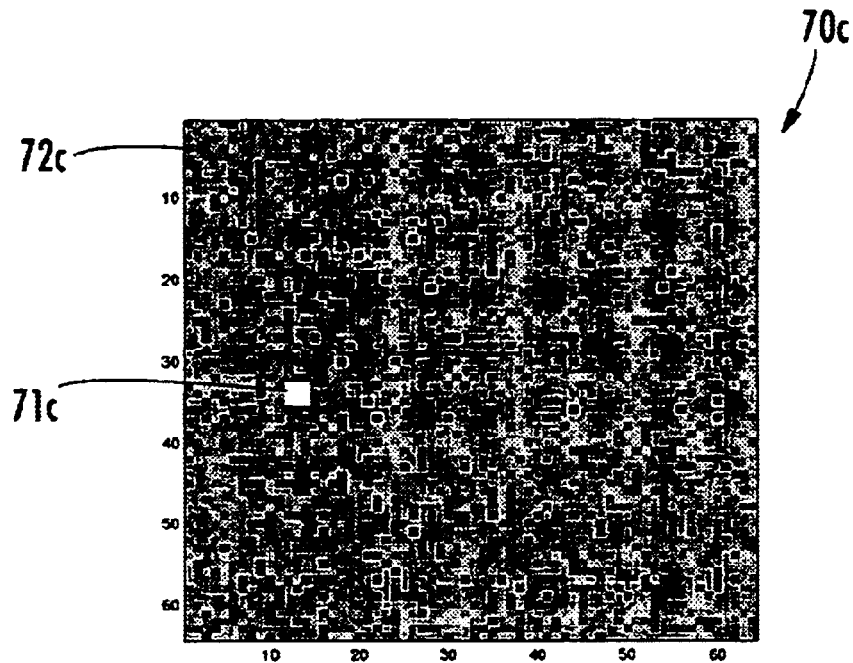

The simulated IPR function resulting from the reflection of the waveforms 34" may be seen in FIG. 6b. Here, each spatial frequency is measured at a variable PRF. As such, the resulting ambiguities 36" are not located at specific cross-range locations but rather are spread both in range and cross-range, as illustratively shown. Thus, even though the ambiguities 36" occur essentially across the entire range and cross-range, the magnitudes of these ambiguities are significantly reduced with respect to those resulting from the stepped frequency waveforms 34 and the fragmented frequency waveforms 34'

The foregoing will be further understood with reference to FIGS. 7 and 8a–8c. More particularly, a simulated reference scene 70 including targets 71 and additive background noise 72, as illustratively shown in the log scale plot of FIG. 7. This reference input scene 70 corresponds to a 40 dB dynamic range. Simulated log scale plots of the same input scene 70 resulting from the reflections of the waveforms 34, 34', and 34" are illustratively shown in FIGS. 8a, 8b, and 8c, respectively. It will be noted with respect to the input scenes 70a, 70b that the waveforms 34, 34' repeat after every fourth frame, and thus produce respective cross-range ambiguities 73 and 74. However, the input scene 70c corresponding to the waveforms 34" advantageously spreads these ambiguities in both range and cross-range, as noted above.

Despite the advantageous spreading of ambiguities provided by the above-described waveforms 34, 34', and 34", due to their different frequency characteristics, it will generally be necessary to process the reflected signals to further reduce the above described artifacts in most applications. In accordance with the present invention, in some embodiments the reflected waveforms may be iteratively deconvolved to significantly mitigate such ambiguities. More particularly, the processor 33 (FIG. 1) illustratively performs iterative deconvolution of stored signals to generate target data.

By way of example, such iterative deconvolution may be performed using a CLEAN algorithm. Generally speaking, a CLEAN algorithm selects the brightest target from among the reflected signals, and this target is moved to a "clean" image with no noise (i.e., ambiguities) in the background. The side lobes (i.e., artifacts) from the target are then deconvolved to reveal a next brightest target, and this process continues until all of the targets have been distinguished from the reflected signals and placed in the clean image. Thus, the resulting clean image includes only the targets and little or no noise.

Before providing a specific example of a CLEAN algorithm for use by the processor 33, it is helpful to note that the auto-correlation ambiguities generally result from matched-filter processing, which is typically performed on reflected signals received by a radar system, as will be understood by those skilled in the art. However, the multiple waveform approach, which is used to resolve ambiguities, results in multiple simultaneous signal returns such that matched-filter processing produces cross-correlation sidelobes, in addition to auto-correlation sidelobes. In accordance with the present invention, a CLEAN algorithm may be used to reduce both auto and cross-correlation artifacts, as will now be described with reference to an exemplary CLEAN signal processing approach.

In particular, to remove auto-correlation artifacts, measurement of an input scene reflectivity x with a signal s(t) is given by:

$$y = hx, \text{ where } y = \begin{bmatrix} y(t_1) \\ y(t_2) \\ \vdots \\ \vdots \\ y(t_m) \end{bmatrix};$$

$$h = \begin{bmatrix} s(t_1 - \tau_1) & s(t_1 - \tau_2) & s(t_1 - \tau_1) \\ s(t_2 - \tau_1) & s(t_2 - \tau_2) & s(t_2 - \tau_1) \\ s(t_3 - \tau_1) & s(t_3 - \tau_2) & s(t_3 - \tau_1) \\ \vdots & \vdots & \vdots \\ s(t_m - \tau_1) & s(t_m - \tau_2) & s(t_m - \tau_1) \end{bmatrix}; \text{ and } x = \begin{bmatrix} x_1 \\ x_2 \\ x_3 \\ \vdots \\ x_t \end{bmatrix}$$

Moreover, pulse compression using matched filtering yields:

$$\hat{x} = h'y = h'hx,$$

which gives an initial estimate degraded by auto-correlation side lobes. The desired estimate is obtained by iteratively removing the auto-correlation side lobes of the brighter scatterers:

$$\hat{x}_{p+3} = \hat{x}_p - h^H h \hat{x}_{max,p}.$$

The column vector from $H^H H$ used to remove a scatterer $x_{max}$ is simply the one-dimensional IPR translated to the scatterer's location. Likewise, a two-dimensional CLEAN algorithm may iteratively remove the translated two dimensional IPR, as will be appreciated by those skilled in the art.

To remove both auto and cross-correlation artifacts, subsequent to the above-referenced matched-filtering step, it will be appreciated by those skilled in the art that the simultaneous receipt of N range swaths measured by N different waveforms gives:

$$y = \sum_n H_n x_n.$$

Performing a matched filter for each signal gives an initial estimate of each range swath plus cross-correlation terms as follows:

$$\hat{x}_m = H_m^H y = H_m^H \sum_n H_n x_n = H_m^H H_m x_m + H_m^H \sum_{n \neq m} H_n x_n.$$

The desired estimate for each range swath is obtained by iteratively removing auto/cross-correlation terms from the brightest scatterers, as follows:

$$\hat{x}_{m,p+1} = \hat{x}_{m,p} - H_m^H \sum_n H_n \hat{x}_{n,p}.$$

In particular, auto-correlation products are removed when $m=n$, and cross-correlation products are removed by making $m \neq n$, as will be appreciated by those skilled in the art.

Figure 9A:
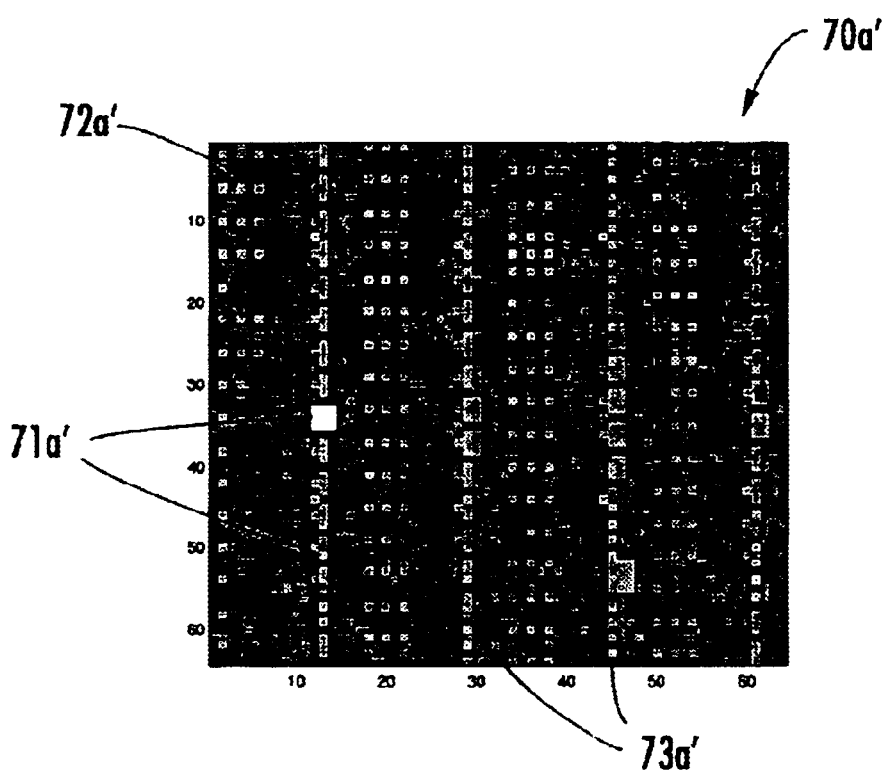
FIGS. 9a–9c are log scale plots of the scene estimates of FIGS. 8a–8c, respectively, following iterative deconvolution processing.
Figure 9B:
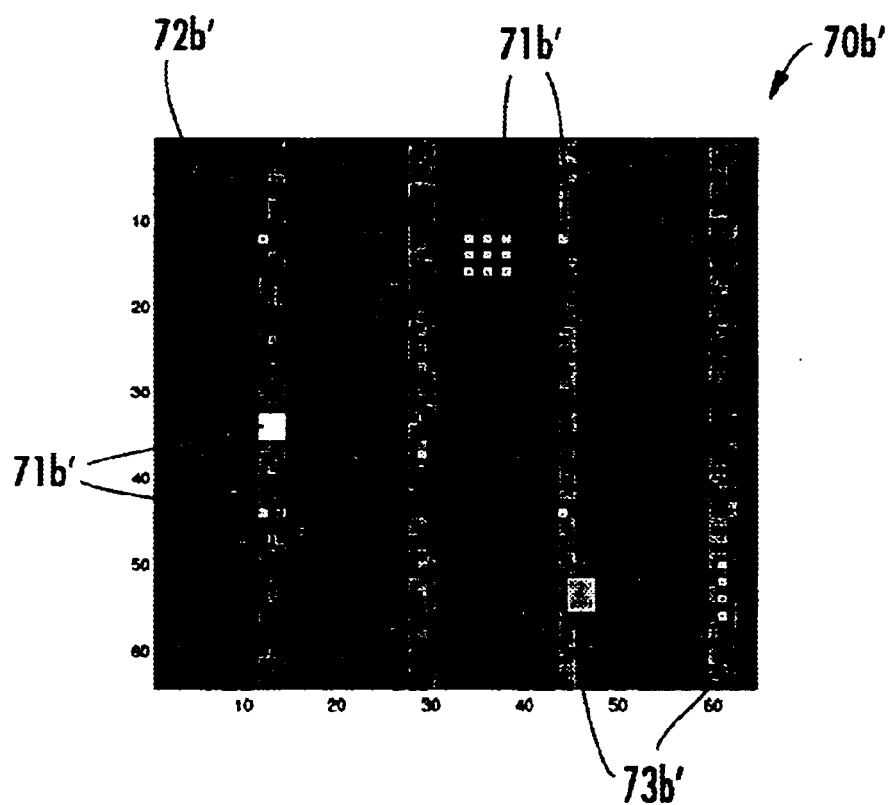
Figure 9C:
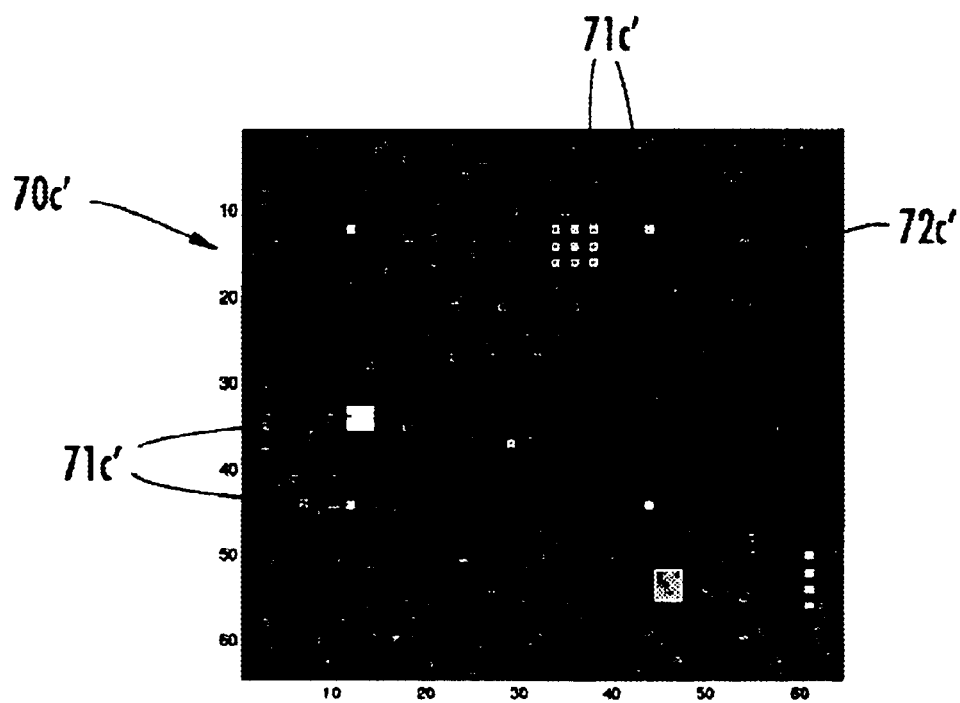

The advantageous results of such iterative deconvolution of the reflected signals will be further appreciated with reference to FIGS. 9a–9c. Here, input scenes 70a', 70b', and 70c' result from two-dimensional CLEAN processing of the unprocessed input scenes as described above. It will be noted that the input scene 70a', while noticeably improved by the CLEAN algorithm, still has significant recurring IPR side lobes 73a' which prevent all of the targets 71a' from being clearly distinguished. Additionally, in the input scene 70b' all of the targets 71b' have been distinguished, but residual side lobes 73b' still remain, which may be unacceptable in certain applications. The best results are provided in input scene 70c', as all of the targets 71c' are clearly distinguished, and the residual ambiguities are spread in range and cross-range such that this scene more closely resembles the reference input scene 70.

From the foregoing, those of skill in the art will appreciate that differing results will be obtained depending upon the different frequency components selected for the waveforms and the particular type of image resolution processing used. The combination of using waveforms having different frequency components and CLEAN processing on reflected signals is particularly advantageous in that it allows an increased PRF to be used to resolve an extended footprint, as residual range ambiguities in the form of auto/cross-correlation artifacts may be removed through the iterative deconvolution. The resulting extended footprint allows use of a smaller antenna which has a larger beamwidth of course, other types of image resolution processing may be performed on the reflected signals in some embodiments, and different frequency components also need not be used in every embodiment.

In fact, the cross-correlation CLEAN algorithm allows the use of waveforms which all have the same frequency components. For example, different pseudorandom phase codes may be used to resolve the ambiguities. The CLEAN algorithm described above will then remove the resulting cross-correlation sidelobes.

Figure 10:
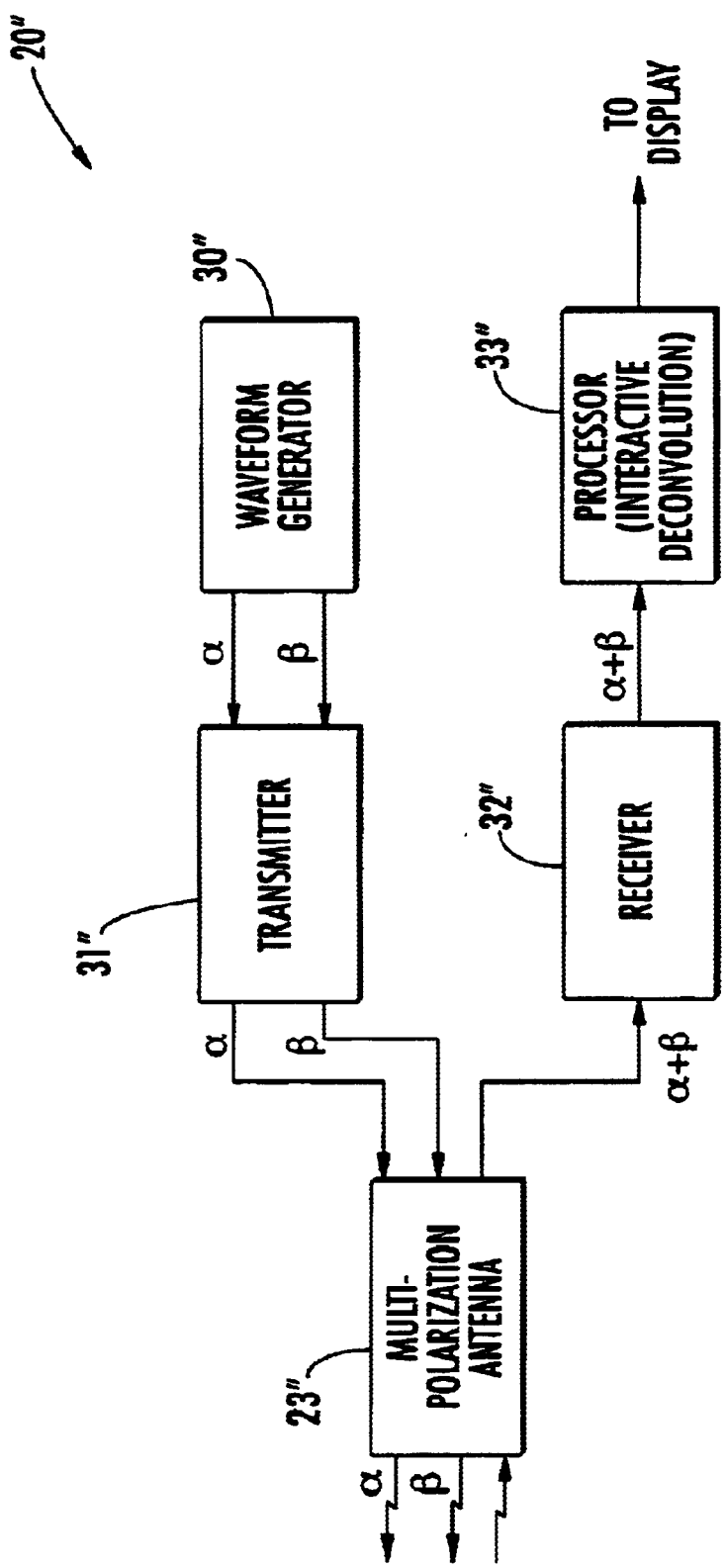
FIG. 10 is a schematic block diagram of a third embodiment of the radar system of FIG. 1.

Another advantageous aspect of the invention is now described with reference to a third embodiment of the radar system 20" illustrated in FIG. 10. In this embodiment, the antenna 23" operates using different polarizations $\alpha$ and $\beta$. By way of example, such polarizations may be horizontal and vertical polarizations, or right and left-hand circular polarizations, though other polarization types may also be used in some embodiments. Accordingly, the waveform generator 30" generates waveforms for the different polarizations $\alpha$ and $\beta$.

In conventional polarimetric SAR, the waveforms for the different polarizations $\alpha$ and $\beta$ are transmitted during alternating transmission cycles with a reception cycle therebetween. Of course, it will be appreciated that the above-described multiple-waveform approach could be used for transmitting separate waveforms for the different polarizations $\alpha$ and $\beta$ simultaneously so that separate transmission cycles are not required, and/or for receiving $\alpha$ and $\beta$ components of the reflected signals. Additionally, the processor 33" also performs iterative deconvolution on the reflected signals, as described above.

In fact, the iterative deconvolution approach provides a full-polarimetric reflectivity estimate, including the cross-polarized scene scattering terms. The returned signal y from a scene with polarimetric reflectivity x and illuminated with signals H and V is given by:

$$y_v = H_v x_{vv} + H_h x_{hv}; \text{ and}$$

$$y_h = H_v x_{vh} + H_h x_{hh},$$

where the H's are the convolution matrices formed using the 1-D time domain signals. An estimate of the scene reflectivity using matched filtering yields:

$$\hat{x}_{vv} = H_v^H y_v = H_v^H H_v x_{vv} + H_v^H H_h x_{hv};$$

$$\hat{x}_{hv} = H_h^H y_v = H_h^H H_v x_{vv} + H_h^H H_h x_{hv};$$

$$\hat{x}_{vh} = H_v^H y_h = H_v^H H_v x_{vh} + H_v^H H_h x_{hh}; \text{ and}$$

$$\hat{x}_{hh} = H_h^H y_h = H_h^H H_v x_{vh} + H_h^H H_h x_{hh};$$

The above estimates each include a cross-correlation term. The desired estimate for each polarimetric component is obtained by iteratively finding the brightest points then removing the cross-correlation terms due to these points:

$$\hat{x}_{vv,p+1} = \hat{x}_{vv,p} - \gamma H_v^H H_h \hat{x}_{hv,p};$$

$$\hat{x}_{hv,p+1} = \hat{x}_{vv,p} - \gamma H_h^H H_v \hat{x}_{vv,p};$$

$$\hat{x}_{vh,p+1} = \hat{x}_{vv,p} - \gamma H_v^H H_h \hat{x}_{hh,p}; \text{ and}$$

$$\hat{x}_{hh,p+1} = \hat{x}_{vv,p} - \gamma H_H^H H_v \hat{x}_{vh,p}.$$

Figure 11:
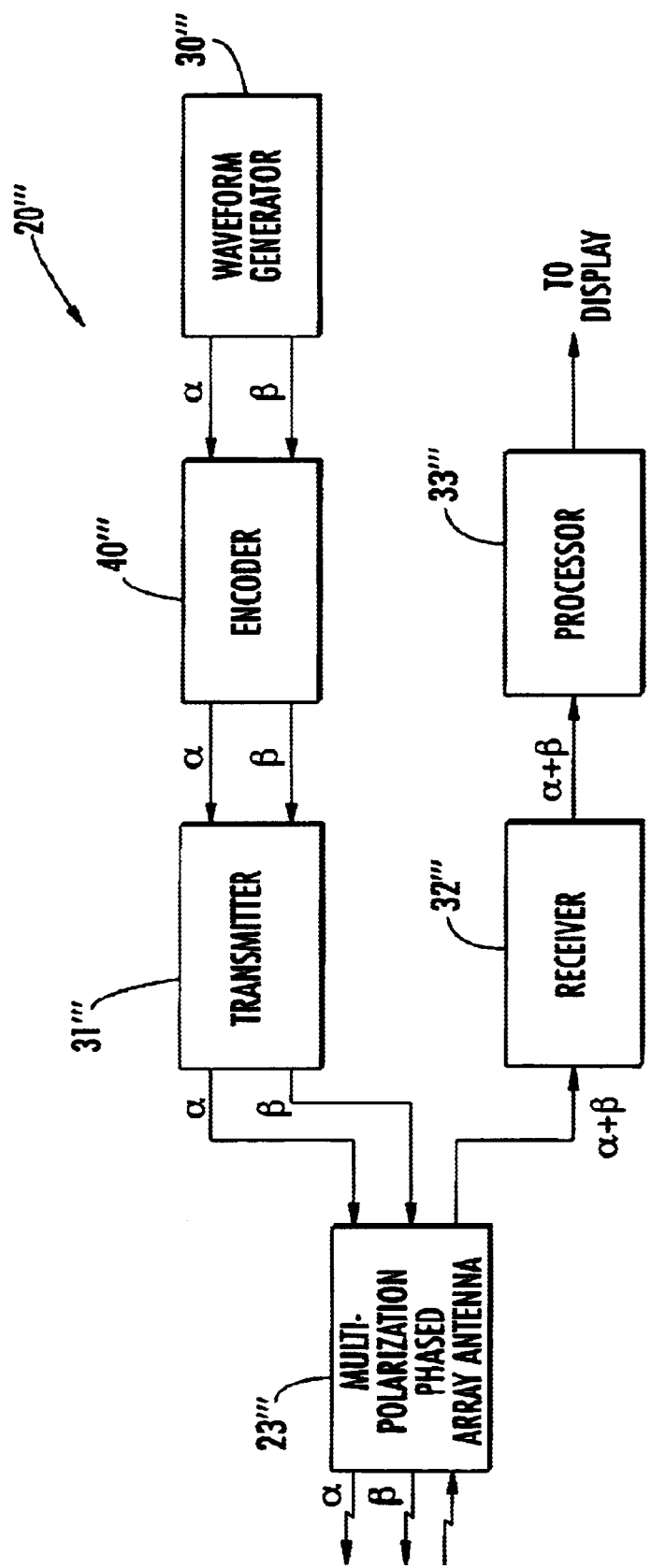
FIG. 11 is a schematic block diagram of a fourth embodiment of the radar system of FIG. 1.

Turning now to FIG. 11, a similar embodiment of the radar system 20''' in which the antenna 23''' again operates using different polarizations $\alpha$ and $\beta$ is now described. The waveform generator 30''' generates waveforms for the different polarizations $\alpha$ and $\beta$, as similarly described above. Yet, in this embodiment an encoder 40''' is connected between the waveform generator 30''' and the transmitter 31''' for encoding the waveforms with identification codes, such as pseudorandom number codes, for example. As such, each of the different polarizations has a respective identification code associated therewith. Of course, while the encoder 40''' is illustratively shown as being a separate component from the waveform 30''' for clarity of illustration, it will be appreciated by those of skill in the art that the waveform generator could perform the encoding operations in some embodiments.

Accordingly, the radar system 20''' can relatively easily accommodate the simultaneous reception of the encoded waveforms for both of the different polarizations $\alpha$ and $\beta$. That is, the processor 33''' can readily separate or filter different reflected polarization signals before iteratively deconvolving the reflected signals. Accordingly, two separate transmission cycles need not be used, as was described above with respect to the radar system 20''. As a result, no increase in PRF is required, and temporal decorrelations resulting from the time between transmission of the waveforms for the $\alpha$ and $\beta$ polarizations can be avoided.

As illustratively shown in FIG. 11, the antenna 23''' may be a phased array antenna, for example. Of course, other suitable antennas known to those of skill in the art may also be used. Moreover, the various functions of waveform generation, encoding, processing, etc., while shown as being performed by separate devices for clarity of illustration and explanation, may in fact be implemented in one or more devices or with software, for example, as will be understood by those skilled in the art.

It will also be appreciated by those skilled in the art that the multiple diverse waveform approach may be applied to a multiple-platform SAR. For example, N platforms, simultaneously transmitting, will provide $N^2$ transmit receive multi-static pairs. Provided that the platforms transmit separate waveforms as described, the extended iterative deconvolution approach can distinctly separate the scene measurements from each of these transmit-receive pairs.

A method aspect of the invention for generating target data will now be described with reference to FIG. 12. The method begins (Block 120) with generating a plurality of waveforms having different frequency components, at Block 121, and transmitting the plurality of waveforms via an antenna 23 (Block 122), as previously described above. The method further includes receiving reflected signals from targets via the antenna 23, at Block 123, and iteratively deconvolving the reflected signals to generate the target data, at Block 124, as also described above, thus ending the method (Block 125).

In an alternate embodiment of the method now described with reference to FIG. 13, generation of the waveforms includes pseudorandomly selecting the different frequency components for the waveforms, and generating the waveforms such that at least some of the waveforms are orthogonal to one another (Block 130'), as previously described above. The target data may be generated using iterative deconvolution or any other suitable image processing approach, at Block 131', as noted above.

Figure 14:
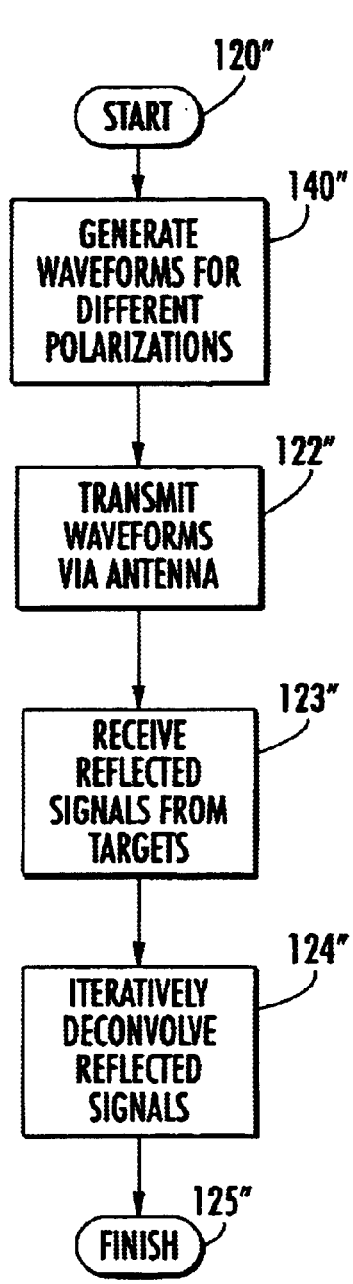
Figure 15:
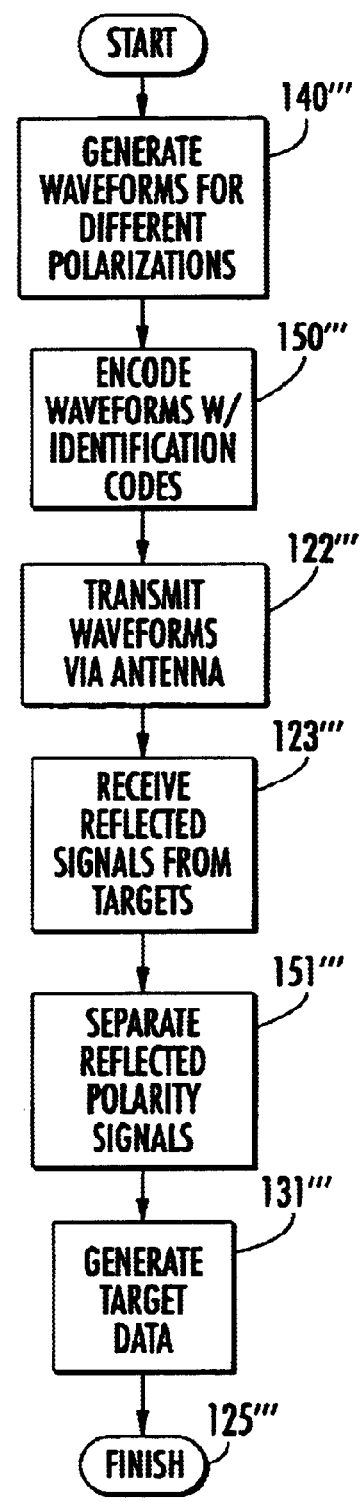

Referring now to FIGS. 14 and 15, additional method aspects of the invention for multi-polarization implementations are now described. In particular, the waveforms may be generated for different polarizations, at Block 140'', as previously described above. Moreover, when different polarizations are used, the various waveforms may be encoded using identification codes corresponding to the different polarizations, at Block 150''', and the different reflected polarization signals may be separated based upon the identification codes, at Block 151''', prior to generation of the target data (Block 131'''). Further method aspects of the invention will be readily apparent to those of skill in the art based upon the foregoing discussion and will therefore not be discussed further herein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radar system comprising:
   an antenna;
   a waveform generator for generating a plurality of waveforms having different frequency components;
   a transmitter connected to said waveform generator for transmitting the plurality of waveforms via said antenna;
   a receiver connected to said antenna for receiving reflected signals from targets; and
   a processor for iteratively deconvolving the reflected signals to generate target data.

2. The radar system of claim 1 wherein said waveform generator pseudorandomly selects the different frequency components for the waveforms.

3. The radar system of claim 1 wherein different frequency components are contiguous to define stepped frequency pulses.

4. The radar system of claim 1 wherein different frequency components are spaced apart in frequency.

5. The radar system of claim 1 wherein said waveform generator generates the plurality of waveforms such that at least some of the waveforms are orthogonal to one another.

6. The radar system of claim 1 wherein said antenna operates using different polarizations; and wherein said waveform generator generates waveforms for the different polarizations.

7. The radar system of claim 6 wherein the different polarizations comprise at least one of horizontal and vertical polarizations, and right-hand and left-hand circular polarizations.

8. The radar system of claim 6 further comprising an encoder connected between said waveform generator and said transmitter for encoding the waveforms using identification codes corresponding to the different polarizations; and wherein said processor separates different reflected polarization signals based upon the identification codes prior to iteratively deconvolving the reflected signals.

9. The radar system of claim 6 wherein the identification codes comprise pseudorandom number codes.

10. The radar system of claim 6 wherein said transmitter simultaneously transmits the waveforms for the different polarizations.

11. The radar system of claim 1 wherein said processor iteratively deconvolves the reflected signals to remove at least one auto-correlation artifacts and cross-correlation artifacts.

12. The radar system of claim 1 wherein the radar system and targets are relatively movable with respect to one another, and wherein said processor stores reflected signals over a length of relative movement and iteratively deconvolves the stored signals to generate the target data.

13. A radar system comprising:

an antenna;

a waveform generator for generating a plurality of waveforms having different frequency components, said waveform generator pseudorandomly selecting the different frequency components for the waveforms and generating the plurality of waveforms such that at least some of the waveforms are orthogonal to one another;

a transmitter connected to said waveform generator for transmitting the plurality of waveforms via said antenna;

a receiver connected to said antenna for receiving reflected signals from targets; and a processor for generating target data based upon the reflected signals.

14. The radar system of claim 13 wherein said antenna operates using different polarizations; and wherein said waveform generator generates waveforms for the different polarizations.

15. The radar system of claim 14 wherein the different polarizations comprise at least one of horizontal and vertical polarizations, and right-hand and left-hand circular polarizations.

16. The radar system of claim 14 further comprising an encoder connected between said waveform generator and said transmitter for encoding the waveforms using identification codes corresponding to the different polarizations; and wherein said processor separates different reflected polarization signals based upon the identification codes prior to generating target data.

17. The radar system of claim 14 wherein the identification codes comprise pseudorandom number codes.

18. The radar system of claim 14 wherein said transmitter simultaneously transmits the waveforms for the different polarizations.

19. The radar system of claim 13 wherein said processor iteratively deconvolves the reflected signals to generate the target data.

20. The radar system of claim 19 wherein said processor iteratively deconvolves the reflected signals to remove at least one auto-correlation artifacts and cross-correlation artifacts.

21. The radar system of claim 13 wherein the radar system and targets are relatively movable with respect to one another, and wherein said processor stores reflected signals over a length of relative movement and generates the target data based upon the stored signals.

22. A radar system comprising:

an antenna for operating using different polarizations;

a waveform generator for generating a plurality of waveforms for the different polarizations;

a transmitter connected to said waveform generator for transmitting the plurality of waveforms via said antenna;

a receiver connected to said antenna for receiving reflected signals from targets; and a processor for iteratively deconvolving the reflected signals to generate target data.

23. The radar system of claim 22 wherein the different polarizations comprise at least one of horizontal and vertical polarizations, and right-hand and left-hand circular polarizations.

24. The radar system of claim 22 further comprising an encoder connected between said waveform generator and said transmitter for encoding the waveforms using identification codes corresponding to the different polarizations; and wherein said processor separates different reflected polarization signals based upon the identification codes prior to iteratively deconvolving the reflected signals.

25. The radar system of claim 24 wherein the identification codes comprise pseudorandom number codes.

26. The radar system of claim 22 wherein said transmitter simultaneously transmits the waveforms for the different polarizations.

27. The radar system of claim 22 wherein said waveform generator generates the plurality of waveforms to have different frequency components.

28. The radar system of claim 27 wherein said waveform generator pseudorandomly selects the different frequency components for the waveforms.

29. The radar system of claim 27 wherein the different frequency components are contiguous to define stepped frequency pulses.

30. The radar system of claim 27 wherein the different frequency components are spaced apart in frequency.

31. The radar system of claim 22 wherein said waveform generator generates the plurality of waveforms such that at least some of the waveforms are orthogonal to one another.

32. The radar system of claim 22 wherein said processor iteratively deconvolves the reflected signals to remove at least one of auto-correlation artifacts and cross-correlation artifacts.

33. The radar system of claim 22 wherein the radar system and targets are relatively movable with respect to one another, and wherein said processor stores reflected signals over a length of relative movement and iteratively deconvolves the stored signals to generate the target data.

34. A radar system comprising:

an antenna which operates using different polarizations;

a waveform generator for generating a plurality of waveforms for the different polarizations;

an encoder connected to said waveform generator for encoding the waveforms using identification codes corresponding to the different polarizations;

a transmitter connected to said encoder for transmitting the plurality of waveforms via said antenna;

a receiver connected to said antenna for receiving reflected signals from targets; and a processor for separating different reflected polarization signals based upon the identification codes and generates target data based upon the separated signals.

35. The radar system of claim 34 wherein the identification codes comprise pseudorandom number codes.

36. The radar system of claim 34 wherein the different polarizations comprise at least one horizontal and vertical polarizations, and right-hand and left-hand circular polarizations.

37. The radar system of claim 34 wherein said waveform generator generates the waveforms to have different frequency components.

38. The radar system of claim 37 wherein said waveform generator pseudorandomly selects the different frequency components for the waveforms.

39. The radar system of claim 37 wherein the different frequency components are contiguous to define stepped frequency pulses.

40. The radar system of claim 37 wherein different frequency components are spaced apart in frequency.

41. The radar system of claim 34 wherein said waveform generator generates the plurality of waveforms such that at least some of the waveforms are orthogonal to one another.

42. The radar system of claim 34 wherein said transmitter simultaneously transmits the waveforms for the different polarizations.

43. The radar system of claim 34 wherein said processor iteratively deconvolves the separated signals to generate target data.

44. The radar system of claim 43 wherein said processor iteratively deconvolves the separated signals to remove at least one of auto-correlation artifacts and cross-correlation artifacts.

45. The radar system of claim 34 wherein the radar system and targets are relatively movable with respect to one another, and wherein said processor stores reflected signals over a length of relative movement and generates the target data based upon the stored signals.

46. A method for generating target data comprising:
generating a plurality of waveforms having different frequency components;
transmitting the plurality of waveforms via an antenna;
receiving reflected signals from targets via the antenna; and
iteratively deconvolving the reflected signals to generate the target data.

47. The method of claim 46 wherein generating comprises pseudorandomly selecting the different frequency components for the waveforms.

48. The method of claim 46 wherein generating comprises generating different frequency components that are contiguous to define stepped frequency pulses.

49. The method of claim 46 wherein generating comprises generating different frequency components that are spaced apart in frequency.

50. The method of claim 46 wherein generating comprises generating the plurality of waveforms such that at least some of the waveforms are orthogonal to one another.

51. The method of claim 46 wherein the antenna operates using different polarizations; and wherein generating comprises generating waveforms for the different polarizations.

52. The method of claim 51 wherein the different polarizations comprise at least one of horizontal and vertical polarizations, and right-hand and left-hand circular polarizations.

53. The method of claim 51 further comprising:
encoding the waveforms using identification codes corresponding to the different polarizations; and
separating different reflected polarization signals based upon the identification codes prior to iteratively deconvolving the reflected signals.

54. The method of claim 53 wherein the identification codes comprise pseudorandom number codes.

55. The method of claim 51 wherein transmitting comprises simultaneously transmitting the waveforms for the different polarizations.

56. The method of claim 46 wherein the iteratively deconvolving comprises iteratively deconvolving the reflected signals to remove at least one of auto-correlation artifacts and cross-correlation artifacts.

57. The method of claim 46 wherein the radar system and targets are relatively movable with respect to one another; wherein the method further comprises storing reflected signals over a length of relative movement; and wherein iteratively deconvolving comprises iteratively deconvolving the stored signals.

58. A method for generating target data comprising:
generating a plurality of waveforms having different frequency components by pseudorandomly selecting the different frequency components for the waveforms and generating the plurality of waveforms such that at least some of the waveforms are orthogonal to one another;
transmitting the plurality of waveforms via an antenna;
receiving reflected signals from targets via the antenna; and
generating target data based upon the reflected signals.

59. The method of claim 58 wherein the antenna operates using different polarizations; and wherein generating comprises generating waveforms for the different polarizations.

60. The method of claim 59 wherein the different polarizations comprise at least one of horizontal and vertical polarizations, and right-hand and left-hand circular polarizations.

61. The method of claim 59 further comprising:
encoding the waveforms using identification codes corresponding to the different polarizations; and
separating different reflected polarization signals based upon the identification codes prior to generating target data.

62. The method of claim 61 wherein the identification codes comprise pseudorandom number codes.

63. The method of claim 58 wherein the transmitting comprises simultaneously transmitting the waveforms for the different polarizations.

64. The method of claim 58 wherein generating the target data comprises iteratively deconvolving the reflected signals to generate the target data.

65. The method of claim 64 wherein iteratively deconvolving comprises iteratively deconvolving the reflected signals to remove at least one of auto-correlation artifacts and cross-correlation artifacts.

66. The method of claim 58 wherein the radar system and targets are relatively movable with respect to one another; wherein the method further comprises storing reflected signals over a length of relative movement; and wherein generating the target data comprises generating the target data based upon the stored signals.

67. A method for generating target data comprising:
generating a plurality of waveforms for different polarizations;
transmitting the plurality of waveforms via an antenna operating using the different polarizations;
receiving reflected signals from targets via the antenna; and
iteratively deconvolving the reflected signals to generate target data.

68. The method of claim 67 wherein the different polarizations comprise at least one of horizontal and vertical polarizations, and right-hand and left-hand circular polarizations.

69. The method of claim 67 further comprising:
encoding the waveforms using identification codes corresponding to the different polarizations; and
separating different reflected polarization signals based upon the identification codes prior to iteratively deconvolving the reflected signals.

70. The method of claim 69 wherein the identification codes comprise pseudorandom number codes.

71. The method of claim 67 wherein transmitting comprises simultaneously transmitting the waveforms for the different polarizations.

72. The method of claim 67 wherein generating comprises generating the plurality of waveforms to have different frequency components.

73. The method of claim 72 wherein generating comprises pseudorandomly selecting the different frequency components for the waveforms.

74. The method of claim 72 wherein the different frequency components are contiguous to define stepped frequency pulses.

75. The method of claim 72 wherein the different frequency components are spaced apart in frequency.

76. The method of claim 67 wherein generating comprises generating the plurality of waveforms such that at least some of the waveforms are orthogonal to one another.

77. The method of claim 67 wherein iteratively deconvolving comprises iteratively deconvolving the reflected signals to remove at least one of auto-correlation artifacts, and cross-correlation artifacts.

78. The method of claim 67 wherein the radar system and targets are relatively movable with respect to one another; wherein the method further includes storing reflected signals over a length of relative movement; and wherein iteratively deconvolving comprises iteratively deconvolving the stored signals to generate the target data.

79. A method for generating target data comprising:
   generating a plurality of waveforms for different polarizations;
   encoding the waveforms using identification codes corresponding to the different polarizations;
   transmitting the plurality of waveforms via an antenna operating using the different polarizations;
   receiving reflected signals from targets via the antenna;
   separating different reflected polarization signals based upon the identification codes; and
   generating target data based upon the separated signals.

80. The method of claim 79 wherein the identification codes comprise pseudorandom number codes.

81. The method of claim 79 wherein the different polarizations comprise at least one of horizontal and vertical polarizations, and right-hand and left-hand circular polarizations.

82. The method of claim 79 wherein generating the plurality of waveforms comprises generating the waveforms to have different frequency components.

83. The method of claim 82 wherein generating the plurality of waveforms comprises pseudorandomly selecting the different frequency components for the waveforms.

84. The method of claim 82 wherein the different frequency components are contiguous to define stepped frequency pulses.

85. The method of claim 82 wherein different frequency components are spaced apart in frequency.

86. The method of claim 79 wherein generating the plurality of waveforms comprises generating the plurality of waveforms such that at least some of the waveforms are orthogonal to one another.

87. The method of claim 79 wherein transmitting comprises simultaneously transmitting the waveforms for the different polarizations.

88. The method of claim 79 wherein generating the target data comprises iteratively deconvolving the separated signals to generate the target data.

89. The method of claim 88 wherein iteratively convolving comprises iteratively deconvolving the separated signals to remove at least one auto-correlation artifacts and cross-correlation artifacts.

90. The method of claim 79 wherein the radar system and targets are relatively movable with respect to one another; wherein the method further comprises storing reflected signals over a length of relative movement; and wherein generating the target data comprises generating the target data based upon the stored signals.

* * * * *

UNITED STATES PATENT AND TRADEMARK OFFICE
CERTIFICATE OF CORRECTION

PATENT NO. : 6,781,540 B1
DATED : August 24, 2004
INVENTOR(S) : Mackey et al.

It is certified that error appears in the above-identified patent and that said Letters Patent is hereby corrected as shown below:

Title page,
Item [75], Inventors, delete "MacKey" insert -- Mackey --

Column 4,
Line 39, delete "-to" insert -- to --

Column 9,
Line 65, delete "beamwidth of course," insert -- beamwidth. Of course, --

Column 10,
Line 43, delete "
$$\hat{x}_{vv} = H_v^H y_v = H_v^H H_v x_{vv} + H_v^H H_h x_{hv};$$
$$\hat{x}_{hv} = H_h^H y_v = H_h^H H_v x_{vv} + H_h^H H_h x_{hv};$$
$$\hat{x}_{vh} = H_v^H y_h = H_v^H H_v x_{vh} + H_v^H H_h x_{hh}; \text{ and}$$
$$\hat{x}_{hh} = H_h^H y_h = H_h^H H_v x_{vh} + H_h^H H_h x_{hh};$$
" insert --
$$\hat{x}_{vv} = H_v^H y_v = H_v^H H_v x_{vv} + H_v^H H_h x_{hv};$$
$$\hat{x}_{hv} = H_h^H y_v = H_h^H H_v x_{vv} + H_h^H H_h x_{hv};$$
$$\hat{x}_{vh} = H_v^H y_h = H_v^H H_v x_{vh} + H_v^H H_h x_{hh}; \text{ and}$$
$$\hat{x}_{hh} = H_h^H y_h = H_h^H H_v x_{vh} + H_h^H H_h x_{hh}.$$
--

Column 16,
Line 7, delete ".and" insert -- and --

Signed and Sealed this

Twenty-eighth Day of June, 2005

JON W. DUDAS
*Director of the United States Patent and Trademark Office*